Dec. 17, 1935.    F. W. McCLOSKEY    2,024,740
MEANS FOR IMPROVING COMMUTATION
Filed June 9, 1934
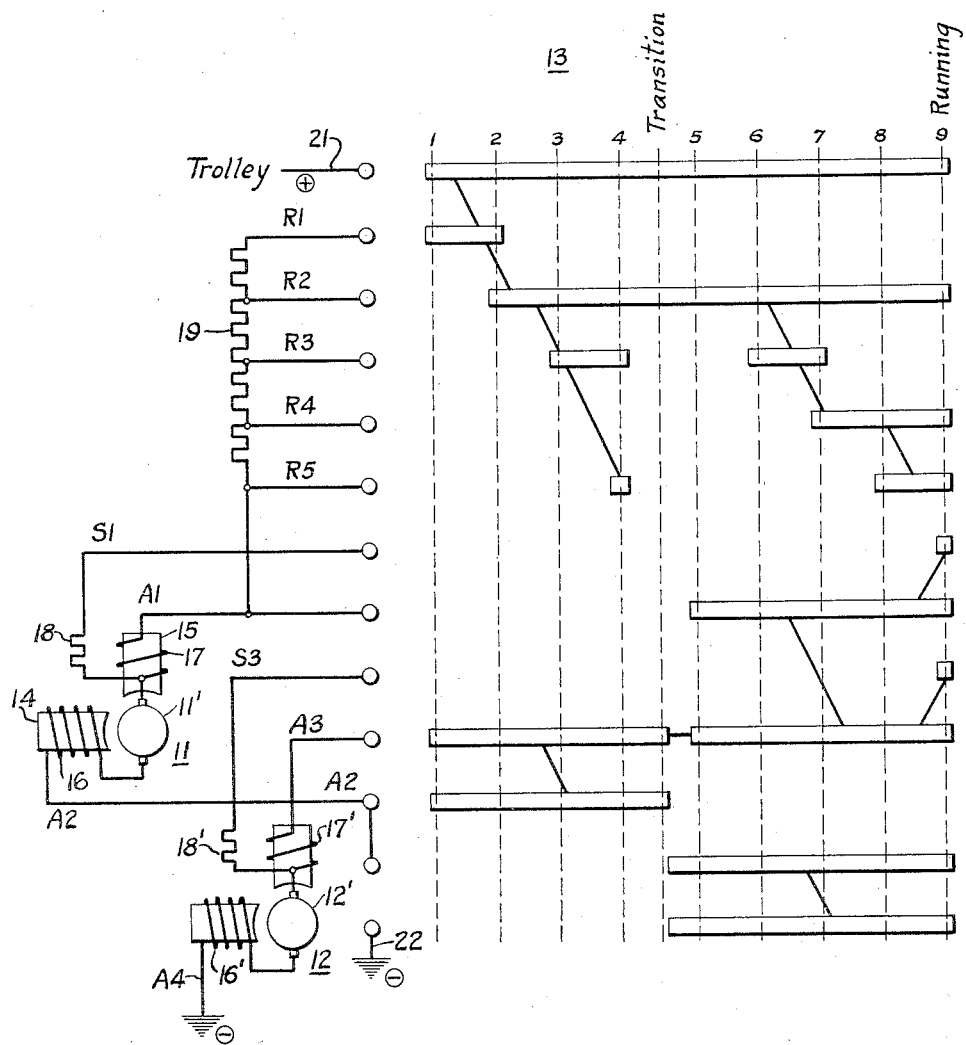
WITNESS
Leon J. Vaza
INVENTOR
Frederick W. McCloskey
BY O. B. Buchanan
ATTORNEY Patented Dec. 17, 1935

2,024,740

UNITED STATES PATENT OFFICE 2,024,740

MEANS FOR IMPROVING COMMUTATION

Frederick W. McCloskey, Wilkinsburg, Pa., assignor to Westinghouse Electric & Manufacturing Company, East Pittsburgh, Pa., a corporation of Pennsylvania Application June 9, 1934, Serial No. 729,826

8 Claims. (Cl. 171—228)

My invention relates to direct-current motors and it has particular relation to series compensated direct-current motors such as are utilized on street cars or for other traction purposes.

As a result of motor bus competition, and also as a result of the utilization of higher running speeds for railways, it has become necessary to hasten the acceleration, and the large, rapidly fluctuating currents thus encountered have entailed commutation difficulties, during the acceleration period, in direct-current traction motors. Such direct-current motors have large masses of unlaminated iron in the field frame and other portions of the magnetic circuit, in which eddy currents are set up whenever the current-strength is varied. During the notching period, in rapidly accelerating a series motor, the current increases very rapidly, and to very large momentary values, at each notch of the controller, but the presence of the aforesaid eddy currents retards the setting up of the necessary flux in the commutating poles, so that the commutating pole-strength fails to follow the armature-current variations, and fails to induce a sufficiently strong counteractive voltage in the short-circuited armature-coil undergoing commutation.

Ordinarily, series direct-current traction motors have been equipped with commutating poles having commutating-pole windings connected in series with the armature circuit, and having a number of ampere-turns which is adjusted to be correct under steady load conditions. This is the desired arrangement under normal running conditions, when the armature current varies so slowly that there is no difficulty at all in the flux-changes following the current-changes. It is necessary to have the commutating field-strength accurately adjusted, because any material departure from the correct adjustment of the commutating field-strength will result in either over- or under-compensation of the armature reaction, so that the proper commutating voltage is not induced in the short-circuited coil undergoing commutation, and the commutation becomes very bad, resulting in short brush-life and commutator-life, and frequency failures because of flashing-over of the commutator.

According to my invention, however, I provide a commutating field-coil having considerably more than the necessary number of turns which would give correct commutation under steady load conditions, so that the motor would be considerably over-compensated during steady load conditions. By this means, I am enabled to introduce a temporary increase of the commutating pole-strength during periods of violent load-fluctuation, particularly during the notching or accelerating period. This can be accomplished in several ways, as will be obvious, the simplest of which, as illustrated and subsequently described, is the utilization of an additional last-notch on the controller, for connecting a shunt across the commutating-pole winding at the end of the acceleration-period, thereby diverting some of the armature-current from the commutating-pole winding during normal or relatively steady-state running conditions, so as to reduce the commutating-pole ampere-turns to the value which is proper to provide best commutation with a steady load.

By means of my invention, I am enabled to counteract the bad commutating conditions which are experienced when a normally compensated series direct-current motor is rapidly accelerated. The over-compensation which is applied during this period counteracts the effects of the eddy currents and enables the commutating flux to properly follow the rapid increases in current which are encountered. It is necessary, however, to correct this over-compensation as soon as steady-state conditions are obtained, or within a reasonably short period of time thereafter, in order to prevent damage to the commutator and brushes.

With the foregoing and other objects in view, my invention consists in the apparatus, systems, combinations and methods hereinafter described and claimed, and illustrated in the accompanying drawing, the single figure of which is a diagrammatic view of circuits and apparatus embodying my invention in an exemplary form.

As shown in the drawing, my invention is illustrated in application to a pair of series compensated direct-current railway motors 11 and 12 which are controlled by means of a drum-controller 13 in accordance with the well-known series-parallel control system, which has been modified, in accordance with my invention, by the addition of a last-notch or running position, as will be described.

Each of the motors 11 and 12 is provided with an armature-core having an armature-winding thereon, which is associated with a commutator, all being shown schematically and designated by the reference numerals 11' and 12', respectively. The stationary or field member has main field poles 14 and commutating field poles or interpoles 15. The magnetic circuits of the motor include massive iron parts, such as 15, in which eddy currents are induced whenever an attempt is made to change the flux therein, so that a flux-change follows somewhat sluggishly after a change in the exciting current applied to such magnetic parts. The motors are shown as being provided with main field-windings 16 and 16' and commutating-pole windings 17 and 17', the latter having more turns than are necessary to provide proper commutation during normal running conditions. The commutating-pole windings 17 and 17' are provided with shunts 18 and 18', respectively, one terminal of each shunt being permanently connected to the inner terminal of its associated commutating-pole windings, and the other terminals of the shunt being brought out, by means of leads S1 and S3, respectively, which are carried to the controller 13.

The motor 11 is connected with its commutating-pole winding 17 and its main field-winding 16 both in series with the armature 11', and the three elements 17—11'—16 are treated as a unit, connected between the armature-circuit terminals A1 and A2 which lead to the controller 13. In like manner, the other motor 12 has its three elements 17'—12'—16' which are treated as a unit and connected between armature-circuit terminals A3 and A4, the terminal A3 being brought out to the controller 13, and the terminal A4 being permanently grounded.

Control is effected by means of a series resistor 19 which is connected in the armature-circuit, said resistor having terminals and taps designated R1 to R5, respectively.

The controller 13 is illustrated as being of the drum-type which, in position 1, makes a connection from the trolley terminal 21 to the resistance 19 and thence to the motor 11 and the motor 12 in series, to the ground-connection at the terminal A4. As the controller is moved to positions 2, 3 and 4, successively, the resistance 19 is gradually cut out, until the two motors are connected directly in series across the line, between the trolley terminal 21, which is represented as the positive conductor (+), and the ground, which is represented as the negative conductor (—).

Between the controller-positions 4 and 5 is a transition, during which the resistance 19, or most of it, is first again thrown in series with the motors 11 and 12, and then the second motor 12 is momentarily short-circuited by connecting the second terminal A2 of the first motor 11 to ground through the ground-terminal contact 23 of the controller, but almost instantly the first terminal A3 of the second motor 12 is disconnected from the terminal A2. As the controller is moved on, into position 5, the motor-terminal A3 is connected, with the motor-terminal A1, to the resistance-terminal R5 of the resistor 19. As the controller is then moved through positions 6, 7 and 8, the resistance 19 is again cut out in steps, until, at position 8, the two motors are operating directly across the line, in parallel, without any resistance in series with them.

This full-parallel position, represented by controller-position 8, is the usual running position of motor controllers prior to my invention. According to my invention, an additional controller-position, which may be designated 9, is added, beyond the position 8, for full or normal running conditions. In this final position 9, the connections are the same as in position 8, except that the two shunts 18 and 18' are connected in parallel with their respective commutating-pole windings 17 and 17', thereby reducing the commutating-pole excitation to the proper value for steady-state conditions, as previously described.

I wish it to be distinctly understood that the particular means which I have shown, for normally operating the motors 11 and 12 with their proper amount of commutating-pole excitation, as in position 9, and temporarily strengthening the commutating-pole field-strength during conditions of extremely violent current-fluctuations, as during the notching period from positions 1 to 8, is only an exemplary embodiment of means for illustrating the principles of my invention. While the means which have been particularly illustrated and described have certain advantages, particularly in the way of simplicity, there are obviously other methods of accomplishing the same or similar results, either manually or by automatically responsive means. I desire, therefore, that the appended claims shall be accorded the broadest construction consistent with their language and the prior art.

I claim as my invention:

1. A direct-current motor having main and commutating poles, windings therefor, an armature winding and core, a commutator associated with the armature winding, a shunt for the commutating-pole winding, serially connected starting resistance in the circuit of the armature winding, and a controller for starting the motor, said controller having a plurality of steps for gradually cutting out said starting resistance, the last step of the controller cutting in said shunt.

2. A direct-current motor having large solid magnetic circuit parts in which it is difficult to suddenly change the flux, said motor including main field windings, an armature winding, a commutator associated with the armature winding, a series-connected commutating-pole winding having enough turns to overcompensate the armature reaction during steady load conditions, and control means whereby a part of the armature current is shunted from said commutating-pole winding under relatively steady load conditions, the ampere-turns of the commutating-pole winding under said relatively steady load conditions being insufficient to overcompensate the commutating pole, and whereby more of the armature current is passed through the commutating-pole winding under a condition of quickly varying current, the ampere-turns of the commutating-pole winding under said quickly varying current-conditions being sufficiently large to overcompensate the commutating pole after the commutating-pole flux has built up to full strength.

3. A direct-current motor having large solid magnetic circuit parts in which it is difficult to suddenly change the flux, said motor including main field windings, an armature winding, a commutator associated with the armature winding, a series-connected commutating-pole winding having enough turns to overcompensate the armature reaction during steady load conditions, and control means for starting said motor with a commutating-pole-winding energization of such strength that the commutating pole would be overcompensated after the flux has built up to full strength, and subsequently shunting out a part of the armature current from the commutating-pole winding to obtain substantially proper compensation of the armature reaction under full-speed conditions.

4. A series, compensated direct-current motor having means for temporarily increasing the commutating-pole strength, during a period of violent load-fluctuations, to values which, if maintained during steady load-conditions, would cause the motor to be materially overcompensated.

5. The method of operating a series, compensated direct-current motor which consists in temporarily increasing the commutating-pole strength, during periods of violent load-fluctuations, to values which, if maintained during steady load-conditions, would cause the motor to be materially overcompensated.

6. The method of operating a series, compensated direct-current motor which consists in starting the motor with enough commutating-pole turns to more than compensate for the armature-reaction, but for the eddy-currents in the magnetic circuit parts of the motor, during rapidly changing current-conditions, and relatively reducing the commutating-pole ampere-turns during full-speed conditions.

7. A direct-current motor having main and commutating poles, windings therefor, an armature winding and core, a commutator associated with the armature winding, said armature winding, main-pole winding and commutating-pole winding being all connected in series with each other, a special shunt for the commutating-pole winding, and multi-speed accelerating-means for starting and accelerating said motor with the special shunt substantially open-circuited, said accelerating-means having associated therewith means for switching-in said special shunt during steady running conditions.

8. A direct-current motor having main and commutating poles, windings therefor, an armature winding and core, a commutator associated with the armature winding, a shunt for the commutating-pole winding, and controller-means having one or more accelerating-positions and one or more running-positions, said shunt being substantially open-circuited when the controller-means is on its accelerating-positions, and said controller-means having associated therewith means for switching-in said shunt when said controller means is on a running-position.

FREDERICK W. McCLOSKEY.